US012112735B2

(12) United States Patent
Vonroth

(10) Patent No.: US 12,112,735 B2
(45) Date of Patent: Oct. 8, 2024

(54) NOISE CANCELLATION SYSTEM FOR A VEHICLE

(71) Applicant: AGCO International GmbH, Neuhausen (CH)

(72) Inventor: Daniel Vonroth, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 55 days.

(21) Appl. No.: 18/057,179

(22) Filed: Nov. 18, 2022

(65) Prior Publication Data

US 2023/0197049 A1 Jun. 22, 2023

(30) Foreign Application Priority Data

Dec. 17, 2021 (GB) .................................... 2118383

(51) Int. Cl.
*G10K 11/178* (2006.01)

(52) U.S. Cl.
CPC .. *G10K 11/17823* (2018.01); *G10K 11/17853* (2018.01); *G10K 11/17873* (2018.01); *G10K 2210/128* (2013.01); *G10K 2210/3011* (2013.01)

(58) Field of Classification Search
CPC ....... G10K 11/17823; G10K 11/17853; G10K 11/17873; G10K 2210/128; G10K 2210/3011
USPC ........................................................ 381/71.4
See application file for complete search history.

(56) References Cited

U.S. PATENT DOCUMENTS

| | | | | |
|---|---|---|---|---|
| 5,404,409 | A | 4/1995 | Nagami et al. | |
| 5,406,149 | A | 4/1995 | An et al. | |
| 5,488,667 | A | 1/1996 | Tamamura et al. | |
| 5,571,239 | A | 11/1996 | Kameda et al. | |
| 5,748,748 | A | 5/1998 | Fischer et al. | |
| 10,593,317 | B1 * | 3/2020 | Bastyr | G10K 11/17833 |
| 10,741,162 | B1 | 8/2020 | Bastyr | |
| 2002/0097884 | A1 | 7/2002 | Cairns | |
| 2006/0056642 | A1 | 3/2006 | Inoue et al. | |
| 2012/0078465 | A1 | 3/2012 | Reilly et al. | |
| 2014/0072134 | A1 | 3/2014 | Po et al. | |
| 2019/0088247 | A1 | 3/2019 | True | |
| 2020/0020314 | A1 * | 1/2020 | Keller | G10K 11/17885 |
| 2020/0135162 | A1 | 4/2020 | Hein et al. | |
| 2020/0337235 | A1 | 10/2020 | Blank et al. | |

(Continued)

OTHER PUBLICATIONS

UK Intellectual Property Office, Search report for related UK Application No. GB2118383.5, dated Mar. 29, 2022.

(Continued)

*Primary Examiner* — Vivian C Chin
*Assistant Examiner* — Douglas J Suthers

(57) ABSTRACT

A noise cancellation system for a vehicle, with a microphone for receiving noise and generating a corresponding noise signal; a loudspeaker for emitting an acoustic wave according to a cancellation signal to cancel the noise; a control unit comprising a memory and a controller; wherein the memory has a noise filter; and wherein the controller is configured to obtain at least a vehicle related information of the vehicle; to configure the noise filter based on the at least one vehicle related information; and to generate a cancellation signal based on the noise signal and the noise filter.

16 Claims, 3 Drawing Sheets

(56) References Cited

U.S. PATENT DOCUMENTS

| | | | | |
|---|---|---|---|---|
| 2021/0104215 | A1 | 4/2021 | Valeri | |
| 2023/0097755 | A1* | 3/2023 | Seneger | G10K 11/1783<br>381/71.4 |

OTHER PUBLICATIONS

European Patent Office, International Search Report related to International Patent Application No. EP 22170306.9, mail date Sep. 28, 2022.

* cited by examiner

NOISE CANCELLATION SYSTEM FOR A VEHICLE

RELATED APPLICATIONS

The present application claims priority under 35 U.S.C. § 119 to United Kingdom Patent Application No. 2118383.5, filed Dec. 17, 2021. The full disclosure, in its entirety, of United Kingdom Patent Application No. 2118383.5 is hereby incorporated by reference.

FIELD

The present disclosure relates generally to a noise cancellation system for a vehicle.

BACKGROUND

Active noise cancellation (ANC) uses a noise cancelling system to reduce unwanted background noise (e. g. in the cabin of a vehicle). The system picks up interfering sound waves by one or more microphones. The control electronics converts the recorded signals of the noises. Acoustic waves are output by at least one loudspeaker in reverse polarity of the noise captured by the microphones as anti-noise or counter sound.

The active noise reduction works best in a defined room. The larger the room to be silenced is the more effort must be made to ensure that the counter sound doesn't create disturbing artefacts. The ANC system works for monotonous noises up to a certain volume. Trouble may arise in case of changing background noise because ANC systems are configured to handle noises that are repeated continuously in contrast to noises that are repeated irregularly. Continuous disturbing noises are gradually cancelled better. Irregular and new disturbing noises must always be cancelled anew by comparing certain measurement data. Although the cancellation takes place almost in real time the counter sound only sets in after a short delay. Thus, irregular noises reach the human's ear unimpeded with full volume at the first moment. This is perceived as a disturbing background noise compared to the steady sounds with a correspondingly homogeneous volume level.

Since an operator of a vehicle has become accustomed to the noise reduction or noise cancellation, suddenly occurring very loud unimpeded background noise can startle him and lead to an unwanted startle reaction, e. g. incorrect operation of the machine by the operator.

SUMMARY

It is an objective to improve the functionality of an active noise cancellation (ANC) system to prevent the occurrence of unwanted noise, especially delayed noise, in order to increase operational safety of vehicles or mobile machines with an operator's cab.

According to an aspect of the invention there is provided a noise cancellation system for a vehicle which comprises a microphone for receiving noise and generating a corresponding noise signal, a loudspeaker for emitting an acoustic wave according to a cancellation signal to cancel the noise, a control unit comprising a memory and a controller. The memory comprises a noise filter. The controller is configured to obtain at least a vehicle related information of the vehicle to configure the noise filter based on the at least one vehicle related information and to generate a cancellation signal based on the noise signal and the noise filter. So, the noise filter can be configured based on the at least one vehicle related information.

The vehicle can be of any type, for example an agricultural machine as a tractor, a combine, a forage harvester, a self-propelled sprayer or the like.

The noise cancellation system can comprise ANC functionality for an active noise cancellation of noises that are repeated continuously. Irregular noises which are not cancelled by the ANC can be cancelled by the noise filter which can be configured by the controller. The controller can process vehicle related information to achieve best cancellation results of the configured noise filter. Based on the vehicle related information the controller can determine which irregular noises are to be expected and configure the noise filter accordingly.

The memory can comprise a modular noise filter comprising at least two filter parts. A first filter part can be adapted to filter a specific irregular noise. A different (second) filter part can be adapted to cancel a different noise. The controller can be configured to select at least one of the at least two filter parts to configure the noise filter. I. e., depending on which irregular noises are expected the controller can select and use a corresponding filter part to configure the noise filter. So, the noise filter can be configured based on at least one filter part.

The sources of irregular noises can be of different types. One source can be an implement connected with the vehicle. To configure the noise filter according to irregular noises caused by the implement the vehicle related information can comprise a type of an implement connected with the vehicle. For example, the type of the implement can be selected by an operator of the vehicle. The controller can also be configured to determine the implement based on received data from the implement, e. g. transmitted via a data link as ISOBUS. Based on the type of the implement a corresponding noise is expected by the controller. As a consequence, the controller can configure the noise filter accordingly and select a corresponding filter part.

Another source can be the vehicle itself wherein the irregular noises depend on different or changing vehicle parameters. Thus, the noise cancellation system can comprise a sensor for detecting at least one vehicle parameter wherein the vehicle related information comprises the vehicle parameter. A vehicle parameter to be sensed can be at least one of wheel speed, real ground speed, slip, tire pressure, wheel weight, weight of vehicle components (front weight), engine speed, transmission speed, brake force, steering angle, power take off speed, windscreen wiper speed, temperatures, mirror adjustment, parameters of a hydraulic system (speed of fluids, flow rate), etc. Based on the expected noise in relation to the vehicle parameter the controller can configure the noise filter accordingly and select a corresponding filter part.

Another source can be the position of the vehicle. Depending on where the vehicle is located different environmental noises can occur. Thus, the noise cancellation system can comprise a position determination unit for determining a vehicle position wherein the vehicle related information comprises the vehicle position. The position determination unit can comprise a global navigation satellite system (GNSS) receiver to transmit the position of the vehicle to the controller. The vehicle position can be matched with a map to identify environmental conditions of the location the vehicle is present. Based on the expected noise in relation to the position of the vehicle the controller can configure the noise filter accordingly and select a corresponding filter part.

Depending on the position of the vehicle the weather conditions can be different which influence the noises. A rainy day will cause other noises in the area of the vehicle than a sunny day. For example, the driving noises on a wet ground are different than on a dry ground. Rain drops falling on the vehicle cab and winds blowing around the vehicle cause additional noises. To consider the weather conditions for configuring the noise filter the vehicle related information can comprise weather information based on the vehicle position. For example, the controller can evaluate weather forecast information received from a weather information service, signals of a rain sensor or possibly additionally an activated windshield wiper. Based on the expected noise in relation to the weather the controller can configure the noise filter accordingly and select a corresponding filter part.

If the vehicle is driving in an agricultural field different noises can occur due to different field properties. The respective field properties can be mapped and stored to the memory. For example, the map can comprise moisture values at different positions within the field, the soil type at different positons within the field as sand, loam, slit or clay, and much more. Based on the determined position of the vehicle the controller can determine the field property of the ground the vehicle is located and determine the noise to be expected when the vehicle is driving on the ground. I. e., the vehicle related information can comprise at least a field property of an agricultural field based on the vehicle position.

In addition, the field property of the agricultural field can comprise at least a characteristic of plants planted on the agricultural field. The location of the plants can be mapped and stored in the memory together with additional plant characteristics as growth state of the plants, moisture level of the plants, etc. Depending on the characteristic of the plants different noises will occur when the vehicle is driving through the field and processes the plants. Based on the expected noise in relation to the field properties the controller can configure the noise filter accordingly and select a corresponding filter part.

The controller can be configured to determine whether the vehicle is located within an agricultural field or outside of the agricultural field based on the vehicle position.

If the vehicle is located within the agricultural field the noise filter can be activated. Thus, irregular noises during a field operation can be cancelled. If the vehicle is located outside of the agricultural field the noise filter can be deactivated. Then, irregular noises caused during a field operation are not expected. If nevertheless such noises occur this could be interpreted as an indication for a failure of the vehicle or the implement. Then, such noise shouldn't be filtered so that it can be heard by the operator to warn him.

The controller can be configured to obtain at least a vehicle related information of a second vehicle wherein the vehicle related information comprises at least the vehicle related information of the second vehicle. The second vehicle can be an additional agricultural vehicle as a tractor, a combine, a forage harvester, a self-propelled sprayer or the like operating in the agricultural field. Due to the field operation of the second vehicle irregular noises can occur to be filtered out. The vehicle related information of the second vehicle can comprise the type of the vehicle. For example, a camera of the first vehicle can detect the type of the vehicle and send the type information to the controller. The first and second vehicles can also be connected via a radio link to exchange data as the type information from one vehicle to the other. The memory can comprise several vehicle type dependent filter parts. Based on the expected noise in relation to the type of the second vehicle the controller can configure the noise filter accordingly and select a filter part corresponding to the detected type of the second vehicle.

The second vehicle can also comprise a position determination unit for determining its position. The position of the second vehicle can be sent to the controller of the first vehicle, e. g. via a communication link as radio, WLAN, or any other data transfer means. I. e., the vehicle related information of the second vehicle can comprise a position of the second vehicle. Since the controller knows the position of the first vehicle the controller can be configured to calculate a distance between the first and the second vehicle and to configure the noise filter based on the distance. Thus, the controller can consider that the greater the distance is the less noisy the noise will be and vice versa. Based on the expected noise in relation to the distance to the second vehicle the controller can configure the noise filter accordingly and select a corresponding filter part.

The controller can be configured to analyze a teach-in sequence comprising at least a command to be executed automatically by the vehicle at the vehicle position. Further, the controller can be configured to obtain the at least one vehicle related information of the vehicle based on the teach-in sequence. The teach-in sequence can be stored in the memory and can comprise several position related commands to be executed when the vehicle approaches the corresponding position in the agricultural field. The commands can be executed by the vehicle or by an implement connected with the vehicle to treat the agricultural field or the plants growing on the field. For example, the teach-in sequence can comprise a first positon to start fertilizing the crop and a second position to stop the fertilizing action. The event when the vehicle approaches the first or the second position can be detected by evaluating the position signals received from the GNSS receiver wherein the controller will start or stop the fertilizing action according to the commands of the teach-in sequence. Based on the expected noise in relation to the execution of the position related commands of the teach-in sequence the controller can configure the noise filter accordingly and select a corresponding filter part.

The controller can be configured to reconfigure the noise filter based on the at least one vehicle related information if at least a vehicle related information of the vehicle has been changed. Since a change of the vehicle related information is an indication that the noise could change the controller can adapt the noise filter to react to the changed situation. The controller can reconfigure the noise filter by adding a filter part, removing a filter part from the noise filter or creating a new noise filter.

The controller can be configured to detect noise exceeding a threshold while a noise filter based noise cancellation is active and to perform a method for active noise cancellation to cancel the noise exceeding the threshold. The threshold can be exceeded if the volume of the noise is too high. Then, both the filter based noise cancellation and the active noise cancellation (ANC) work simultaneously. The filter based noise cancellation is used to cancel the irregular noise and the ANC is used to cancel the noise not covered by the filter based noise cancellation.

The controller can be configured to generate a new filter part to cancel the noise exceeding the threshold and to store the new filter part to the memory. Since the ANC determines an acoustic wave in terms of a counter sound the controller can define this counter sound as a new filter part. The next time when the noise occurs the controller can select the corresponding filter part to configure the noise filter and to avoid that the noise will exceed the threshold again.

The controller can be configured to analyze the noise, to detect a noise resulting from a damage or a fault of the vehicle or the implement and to exclude the noise resulting from the damage or the fault from noise cancellation. Otherwise, the controller would cancel the noise resulting from a damage or a fault of the vehicle or the implement. Then, the noise indicating a damage couldn't be recognized by the operator. But the exclusion of noise indicating a damage from the noise filtering enables that the noise can be heard by the operator and to motivate the operator to initiate a safety measure as to stop the vehicle, the implement or any function of both.

According to an aspect of the invention a method is provided for performing noise cancellation comprising the steps of receiving a noise, generating a noise signal corresponding to the received noise, obtaining at least a vehicle related information of the vehicle, configuring a noise filter based on the at least one vehicle related information, generating a cancellation signal based on the noise signal and the noise filter and emitting an acoustic wave according to the cancellation signal to cancel the noise.

The method can be executed by the noise cancellation system. The noise can be received by the microphone. The controller can generate the noise signal corresponding to the received noise, obtain the at least one vehicle related information of the vehicle, configure the noise filter based on the at least one vehicle related information and generate the cancellation signal based on the noise signal and the noise filter. The loudspeaker can emit the acoustic wave according to the cancellation signal to cancel the noise.

The method can be a computer implemented method.

The method can comprise the steps of providing at least two filter parts and selecting at least one of the at least two filter parts. The steps can be executed by the controller.

The method can comprise the step of determining a vehicle position.

The method can comprise the steps of determining whether the vehicle is located within an agricultural field based on the vehicle position and activating the noise filter if the vehicle is located within the agricultural field.

The method can comprise the steps of determining whether the vehicle is located outside of an agricultural field based on the vehicle position and deactivating the noise filter if the vehicle is located outside of the agricultural field.

The method can comprise the step of obtaining at least a vehicle related information of a second vehicle.

The method can comprise the steps of determining a position of the second vehicle, calculating a distance between the first and the second vehicle and configuring the noise filter based on the distance.

The method can comprise the steps of analyzing a teach-in sequence comprising at least a command to be executed automatically by the vehicle at the vehicle position and obtaining the at least one vehicle related information of the vehicle based on the teach-in sequence.

The method can comprise the step of reconfiguring the noise filter based on the at least one vehicle related information if at least a vehicle related information of the vehicle has been changed.

The method can comprise the steps of detecting noise exceeding a threshold while a noise filter based noise cancellation is active and to performing a method for active noise cancellation to cancel the noise exceeding the threshold.

The method can comprise the steps of generating a new filter part to cancel the noise exceeding the threshold and to storing the new filter part to the memory.

The method can comprise the steps of analyzing the noise, detecting a noise resulting from a damage or a fault of the vehicle, and excluding the noise resulting from the damage or the fault from noise cancellation.

BRIEF DESCRIPTION OF THE DRAWINGS

Several aspects of the invention will now be described, by way of example only, with reference to the accompanying drawings, in which.

DETAILED DESCRIPTION

Figure 1:
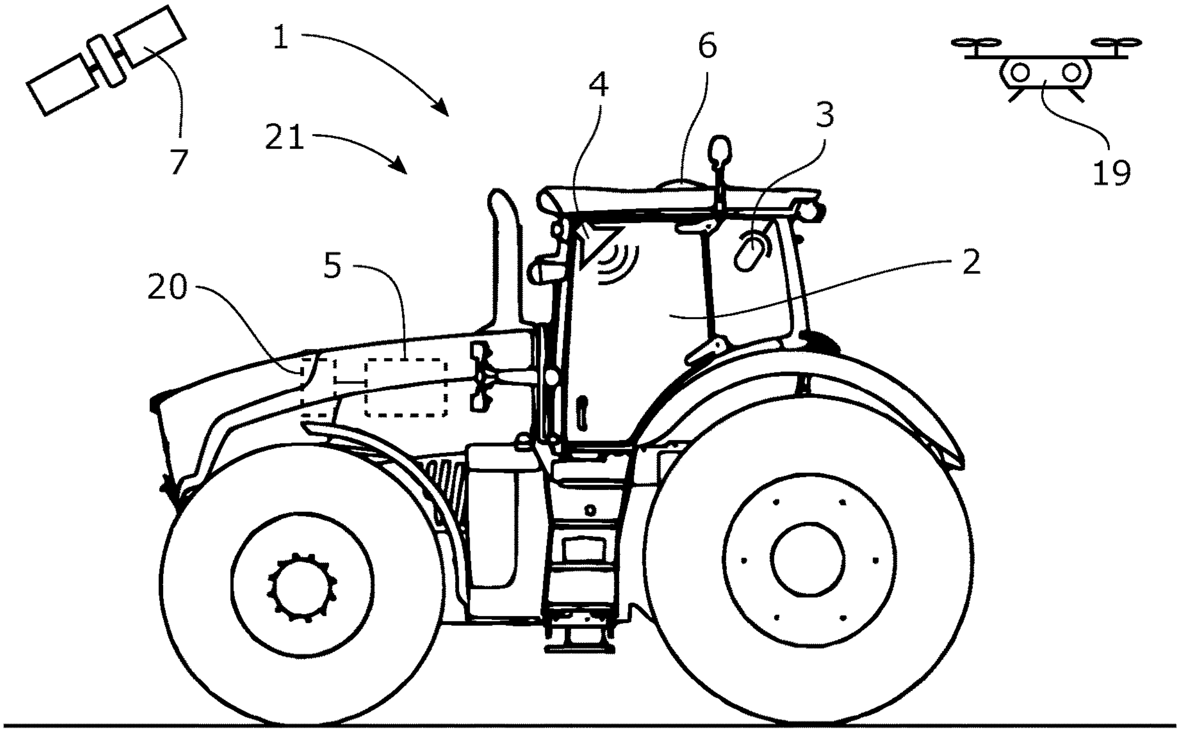
FIG. 1 shows an agricultural vehicle comprising a noise cancellation system.

FIG. 1 shows a vehicle 1, e. g. an agricultural machine 1 as a tractor, which comprises a cabin 2 and a noise cancellation system 21. The noise cancellation system 21 comprises a loudspeaker 3 and a microphone 4 that are both installed in the cab 2 and a control unit 5 installed in the vehicle 1. A global navigation satellite system (GNSS) receiver 6 is mounted on the roof of the cabin 2. The GNSS receiver 6 receives signals from a GNSS 7, in particular position signals for determining the position of the vehicle 1.

Figure 4:
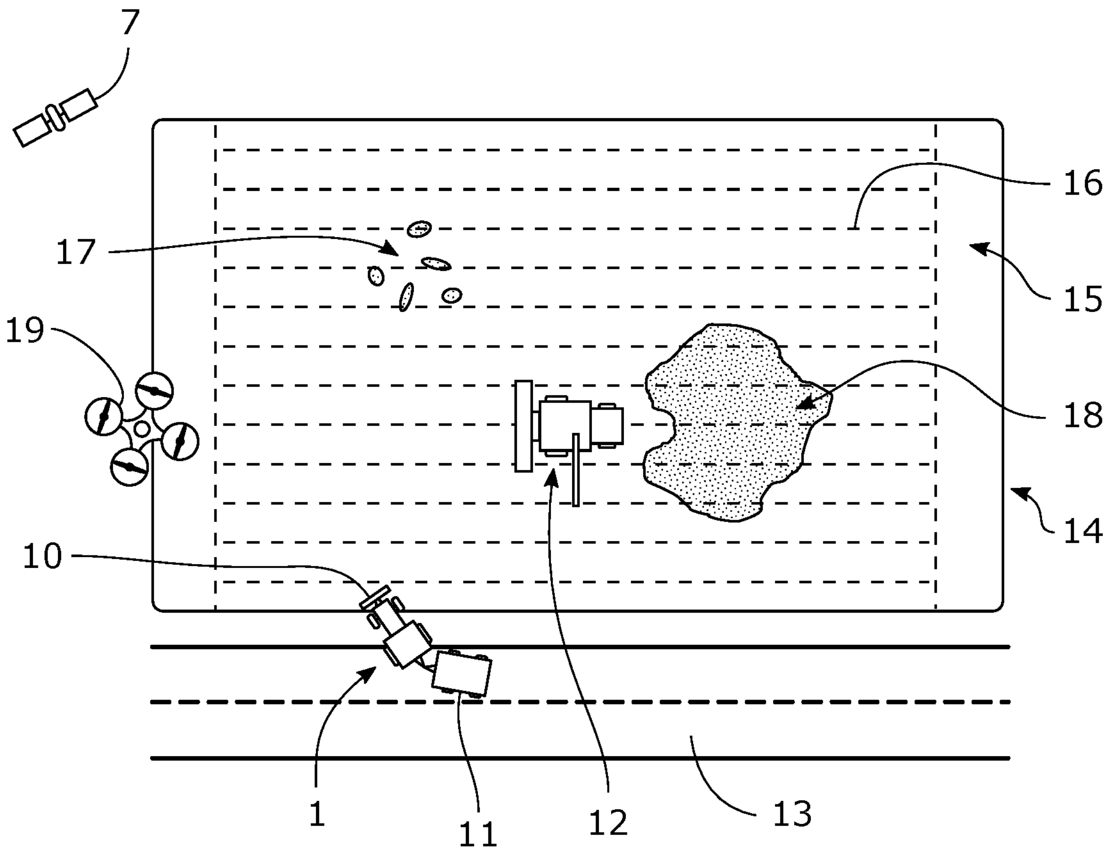
FIG. 4 shows an agricultural field and agricultural vehicles operating in the field.

As shown in FIG. 4, the vehicle 1 may be connected to a first, front implement 10, for example a front mower, and a second, rear implement 11, for example a loader wagon. A drone 19 may determine field data about geodetic data and 3D mapping data about vegetation and plant coverage of an agricultural field 14 and transmit all data to the control unit 5 of the vehicle 1.

Optionally, the loudspeaker 4 can be integrated in a portable device with or without an additional external microphone, such as a headset, headphones, hearing aid, etc. The portable device is connectable to the control unit 5, e. g. via Bluetooth® or other wireless signal transfer method or also wired transfer.

Figure 2:
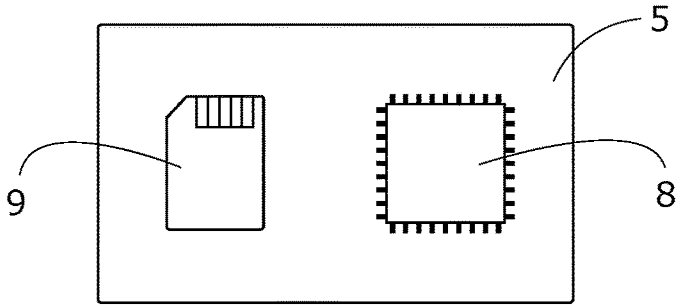
FIG. 2 shows a control unit for supporting the noise cancellation.

FIG. 2 shows the control unit 5 comprising a controller 8 and a memory 9. The memory 9 contains data and executable programs (computer-implemented procedures or methods) that can be retrieved, processed and executed by the controller 8. The controller 8 can also store data in the memory 9. The controller 5 is connected to all devices of the agricultural machine 1 as the microphone 3, the speaker 4, the GNSS receiver 6 and a sensor 20.

Figure 3:
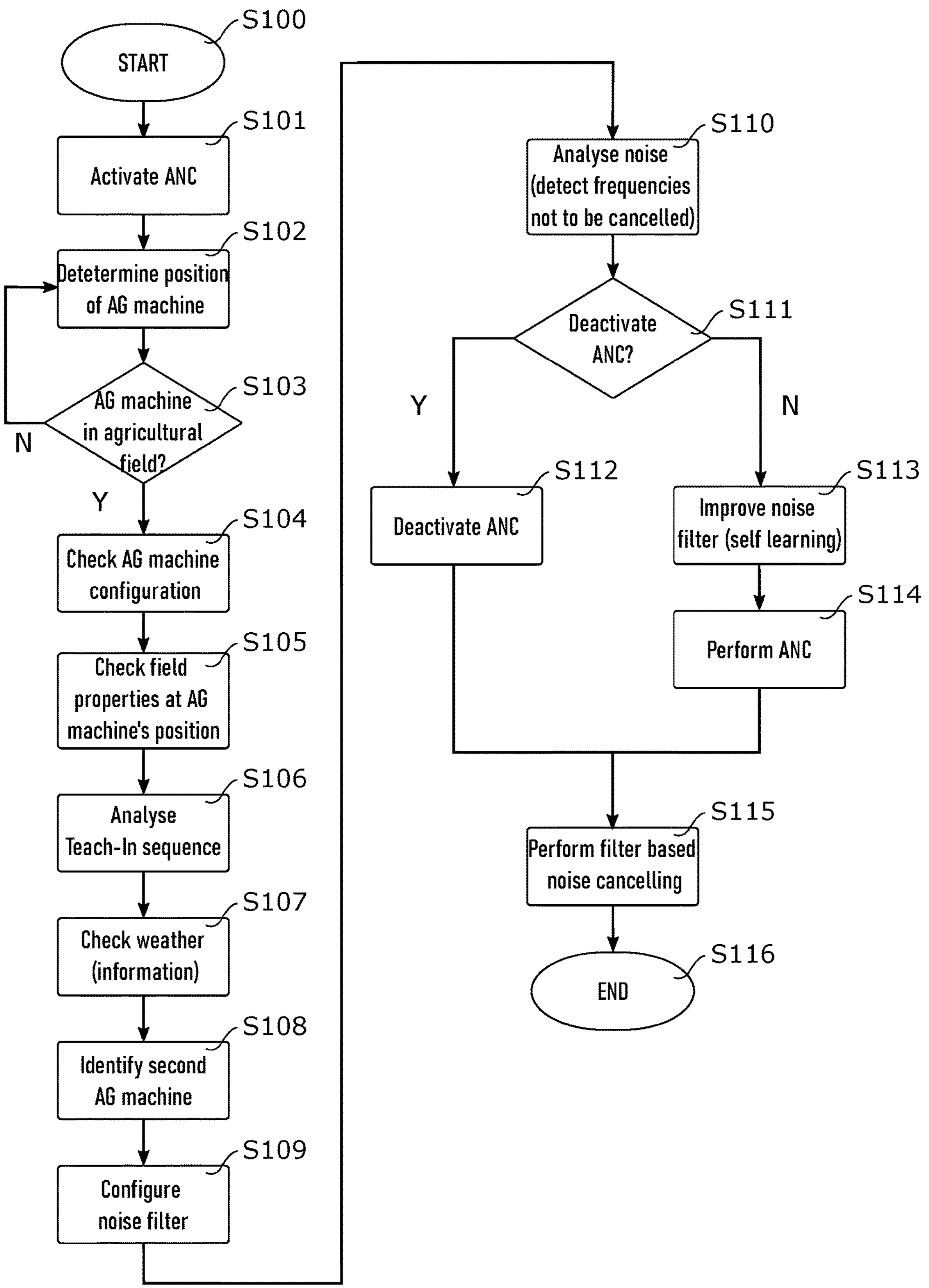
FIG. 3 shows a flow diagram of a method for performing noise cancellation.

FIG. 3 shows a flow diagram of a method stored as a computer-implemented method in the memory 9. The method is executed by the noise cancellation system 21 and can be started automatically (S100), e. g. when an engine of the agricultural machine 1 is started. Then, in step S101, active noise cancellation (ANC) is activated in order to eliminate disturbing sound waves propagating in the cabin 2.

The disturbing sound waves can be, for example, driving noises (engine noises, rolling noises of the tires, driving wind noises, noises of an implement, etc.) which occur while the vehicle 1 is stationary or driving along a road 13, field path or field 14 under the most varied combination and load scenarios.

The disturbing sound waves are sensed by the microphone 3 and converted into signals. The signals are fed to the control unit 5. Thereupon the controller 8 evaluates the signals and generates signals for noise cancellation to emit a counter noise with a sound wave path of 180° (=half a wavelength) opposite to the disturbing noise. The counter noise is then output by the loudspeaker 4 in the cabin 2. As a result of the ANC, the sound waves from the disturbing noise and the counter noise overlap and cancel out each other.

This conventional method of noise elimination works very well for monotonous noises, such as an engine noise or a tire rolling noise. In case of a changing background noise, for example when an agricultural machine is operating in the agricultural field 14, delays in the noise cancellation can be perceptible to the operator of the vehicle 1 although the noise cancellation takes place almost in real time.

Therefore, according to an aspect of the invention the ANC will be optimized for field work or off-road applications. The controller 8 can obtain at least one vehicle related information of the vehicle 1 to configure the noise filter based on the at least one vehicle related information. The method comprises several steps to determine various vehicle related information (see steps S102 to S108).

The method continues with step S102 and the controller 8 determines the position of the vehicle 1 based on the GNSS 7 position signals received from the GNSS receiver 6.

In the following step S103, the controller 8 checks whether the vehicle 1 is located in the agricultural field 14. As long as the vehicle 1 is outside the field 14, the query after step S103 is repeated continuously.

As shown in FIG. 4, it is assumed now that the vehicle 1 with the front implement 10 and the rear implement 11 drives onto the agricultural field 14 from a road 13 or field path. The position of the vehicle 1 is tracked or monitored by the GNSS 7 and/or the drone 19. The positional information can be sent to the controller 8. Based on the position check, the controller 8 detects that the vehicle 1 is now in the field 14 and activates the off-road mode of the ANC in response.

With the off-road mode of the ANC activated, the controller 8 configures a noise filter adapted to the configuration of the vehicle 1, to its area of use and to its environment of use and performs noise reduction or noise elimination by means of this noise filter.

The controller 8 can be configured to select at least a fixed filter part out of several fixed filter parts. All fixed filter parts can be stored in the memory 9. The fixed filter parts can be used as modules to create a modular noise filter. The controller 8 can select two or more filter parts and combine them for the configuration of the (modular) noise filter. The modular noise filer can be stored in the memory 9. Besides the configuration of the noise filter the controller 8 can optionally be configured to optimize an existing fixed filter part and/or to create a new fixed filter part by a self-learned filter part to be stored in the memory 9.

The configuration of the noise filter can be based on known and/or by at least a sensor detectable environmental conditions when the vehicle 1 is operating to build up and continuously extend a database stored in the memory 9 by the control unit 5. The control unit 5 uses the extended database to generate the best possible performance for the counter noise.

Fixed Filter Part:

For the configuration of the fixed filter part, the controller 8 accesses a database stored in the memory 9. The database comprises filters already determined for the corresponding vehicle or implement.

After the controller 8 has recognized that the vehicle 1 is driving in the field 14, i. e. off the road 13, the method according to FIG. 3 continues with the configuration of the fixed filter part. To do this, at least one of the steps S104 to S108 is carried out. This means that all steps S104 to S108 can be carried out in any order or individual steps can be skipped or omitted.

The individual steps will be explained now in more detail.

According to step S104, the configuration of the vehicle 1 is checked. As can be seen from FIG. 4, the vehicle 1 is connected to a first, front implement 10, e. g. a front mower, and a second, rear implement 11, e. g. a loader wagon. This vehicle configuration is only exemplary. In principle, all vehicle combinations are possible. For example, instead of a tractor, another machine such as a forage harvester can be used.

The controller 8 can recognize which vehicle 1 or combination of machines is used. Corresponding data is stored in the memory 9 or can be retrieved from the implements 10 or 11 by the controller 8 for example via a data link as ISOBUS. Alternatively, the user of the vehicle 1 can be prompted to specify the corresponding configuration of the vehicle 1, e. g. by means of a configuration menu, for providing the data to the controller 8.

Based on the detected configuration of the vehicle 1, the controller 8 evaluates all parameters which are related to the configuration of the vehicle 1 and are relevant for the configuration of the filter. The parameters can depend on among others:

Type of cab, type of engine, type of transmission, equipment line, equipment options, type of pneumatic system, driving conditions, wheel speed, vehicle speed, slip, tire pressure, type of tire tread, tread depth, tire size, tire age, number of tires, wheel weight, vehicle weight, load, type of front loader, engine speed, transmission speed, all-wheel drive, activation of differential, activation of brake, steering angle, activation of cruise control, PTO speed, interior noise, type of suspension, activation of air conditioning, position of windows, roof hatch or door (opened or closed), activation of windscreen wipers, mirror adjustment, activation of hydraulic system (valves, hydraulic pump (speed, flow rate)), etc.

Based on the recognized or selected (ISOBUS) implement, the parameters can depend on among others: PTO input speed, type of sub-gearbox, activation of conveyor belt, load, speeds, type of pumps, type of motors, etc.

Depending on the configuration of the vehicle 1 and how its signals or parameters vary, the noise generated by the vehicle 1 will vary.

For example, the vehicle 1 will produce a recurring noise when accelerating from a first engine speed, e. g. 1500 rpm, to a second engine speed, e. g. 1900 rpm. However, this noise will vary depending on the gear selected for the transmission. I. e., acceleration with a selected first gear will produce a different noise than acceleration with a selected second or a selected third gear even when accelerating from the same first to the same second engine speed for all selected gears. The other parameters may behave similarly.

Since the controller 8 is aware of the configuration of the vehicle 1 and permanently monitors the operating conditions, the controller 8 can react immediately and practically without delay to the prevailing noise generation. The controller 8 selects the filter settings required for noise cancellation according to the detected configuration of the vehicle 1 and the parameters for the fixed filter part from the database stored in memory 9. The controller 8 adjusts the noise filter immediately in the event of a change of the configuration of the vehicle 1 or a change of the parameters.

Thus, an advantage over conventional ANC can be achieved: The disturbing frequencies of the noises are known (stored in the memory 9) and are expected by the controller 8 based on the detected configuration and parameterization of the vehicle 1. Therefore, the noises can be detected more quickly and subsequently filtered better. The time delay from the detection by the controller 8 to the output of the counter sound for noise cancellation by the loudspeaker 4 is minimized compared to a constant ANC readjustment.

The method proceeds to step S105. According to step S105, the field characteristics are checked at the position where the vehicle 1 is located in the field 14 and can be determined as vehicle related information of the vehicle 1. The control unit 5 may request the position of the vehicle 1 from the GNSS receiver 6. Alternatively or additionally, the control unit 5 can determine the positions of the vehicle 1 in the field 14 in advance on the basis of paths 16 selected by the user, e. g. from an existing database.

The relevant data and parameters regarding areas of the field 14, such as stored paths 16, headland 15, special ground conditions as wet spots 18, obstacles 17 within the field 14 or other vehicles 12 operating in the field 14 are determined and taken into account accordingly by the controller 8 for the configuration of the noise filter.

The controller 8 compares the position of the vehicle 1 with a map of the field comprising field properties stored in the memory 9 and determines the corresponding field properties present at the position of the vehicle 1 in the field 14. Depending on the field properties, different noises can be expected. For example, the field 14 may comprise potholes 17 and/or damp or wet spots (puddles) 18. When the vehicle 1 drives over these field areas 17, 18 different disturbing noises due to changing conditions will occur which in turn differ from the noises when driving over the field 14 outside these field areas 17 or 18.

The following additional field properties can influence the occurrence of the disturbing noises: Topography, gradients (driving uphill, downhill), furrows, arable land, meadow, different soil or subsoil conditions (potholes, loamy, stony, rocky subsoil, wet spot, soil moisture), vegetation, etc.

If the controller 8 is aware of the current conditions about seed, type of plants, moisture of plants, height of vegetation, etc. in the field (e. g. by evaluating a map of the field comprising all this data) this data can be considered for the configuration of the noise filter and the selection of a corresponding filter part.

The paths 16 and the tasks of prior field operations executed along the paths 16 (e. g. seeding of specific seeds) can be stored in the database. Thus, the controller 8 can recognize, for example, the type of crop to be harvested at a later field operation based on the information of the database. Since harvesting of corn produces different sounds than harvesting of grain, the fixed filter part can be configured according to the specific crop to be harvested.

The database can also comprise geodetic data including additional 3D mapping data of vegetation and growth of plants (crop) captured by a drone 19.

Based on the determination of the field properties present at the position of the vehicle 1 the expected noises can be determined in advance by the controller 8 and the filter parts required for noise cancellation can be selected for the configuration of the noise filter.

According to step S106, a teach-in sequence to be executed by the vehicle 1 is analyzed by the controller 8 with regard to the disturbing noises to be expected. Since the tasks of the vehicle 1 and its implements 10 and 11 for the field operation are predetermined by the teach-in sequence, the expected noises occurring during the field operation can be determined in advance by the controller 8. Consequently, the controller 8 can pre-configure the fixed noise filter accordingly by selecting an appropriate filter part for each task.

According to step S107, the weather data and data derived thereof can be determined by the controller 8 as additional vehicle related information of the vehicle 1 based on the position of the vehicle 1

The controller 8 can receive professionally prepared weather data from various online archives. The weather data can be based on detailed topography (up to 90 meters accuracy) comprising precise values of latitude and longitude. The weather data can additionally be used for determining the current wind speed, the ground temperatures (in 5 to 10-minute intervals) and precipitation amounts in the last (e. g. 48) hours, etc. as well as the current weather situation for the selection of appropriate filter parts in this regional area and the configuration of the noise filter.

According to step S108, the controller 8 determines the presence of further vehicles 12 operating in the field 14 near to the vehicle 1 as additional vehicle related information of the vehicle 1. For example, the controller 8 can receive the position and the type of the further vehicle 12, as well as information about the field operation executed by the vehicle 12. Based on this information, the controller 8 selects an appropriate filter part and configures the noise filter. Thus, noise of the further vehicle 12 intruding into the cab 2 of the vehicle 1 can be cancelled.

After steps S102 to S108 have been run through, the controller 8 has determined vehicle related information of the vehicle 1 in order to select the filter parts needed and to configure the noise filter accordingly in the following step S109. In step S109, the vehicle related information is processed by the controller 8. The controller 8 configures the noise filter by combining the selected filter parts so that the settings required to cancel the expected noises are made by the corresponding filter parts in accordance with steps S102 to S108.

Then, the controller 8 continues with step S110 and analyses the noise recorded by the microphone 3. If noise is detected that potentially indicates damage or a fault of the vehicle 1 this noise is excluded from the filtering or processed separately. If the controller 8 detects an impending damage or fault, it issues a warning to the user of the vehicle 1.

The method of FIG. 3 continues with step S111 and checks whether the ANC should be switched off in order to carry out noise elimination using the noise filter only, or whether the ANC should remain active in order to optimize the noise filter using a self-learned filter part. The decision whether to switch off the ANC can be made by the user of the vehicle 1 or automatically decided by the controller 8.

If the controller 8 detects an inhomogeneity, latency or indifference exceeding a predefined threshold for the noise cancellation the user of the vehicle 1 will be informed by a message (warning signal, pop-up, etc.) that the self-learning mode can be started manually.

Alternatively, the controller 8 can automatically detect at step S111 that an optimization of the noise filter is required.

Then, the procedure for optimizing the noise filter is started automatically by the controller 8 at step S113 to determine the data set of a self-learned filter part.

If no optimization of the noise filter shall be performed by a self-learning procedure the method continues with step S112 and the controller 8 deactivates the ANC.

Then, the method proceeds to step S115 and the controller 8 generates a signal for a counter-sound based on the fully configured noise filter and sends this signal to the loudspeaker 4 for emitting the counter-sound and cancelling the disturbing noise.

If an optimization of the noise filter shall be performed by a self-learning procedure the method continues with step S113. The controller 8 uses the existing filter parts as well as the data of the operating states of the vehicle 1 and the implements 10, 11 stored in the memory 9 as a basis for a self-learning process of further filter parts.

The controller 8 analyzes the existing filter parts in more detail by processing the received noise from the microphone 3 using the ANC. The analyzed filters are stored in the memory 9 when they reach a certain amount of data. Thus, a more detailed data basis of all existing operating states with various combinations of implements 10 or 11 in each driven field area is created by the ANC using an online location and position determination under consideration of the weather data (cf. step S107), movement states, etc. If the quality and effectiveness of the filtering is within the range of the predefined thresholds the data is stored to the memory 9 and serves as a basis for the filter parts to be selected.

The quality and effectiveness of the filtering is actively monitored at all times. If any inhomogeneity, latency or indifference of the filtered noises is detected, e. g. caused by new background noise, a modified filtering (see S113) and a further noise cancellation are initiated. The implementation of artificial intelligence (AI) can support a more sensitive and efficient self-learning procedure. Then, the data is saved and used as a basis (see S115) for any later filter selection.

The new self-learned filter part is added to the memory 9 and made available as an additional filter part that can be selected by the controller 8.

The method continues with step S114 and the controller 8 performs an ANC to minimize the noise that cannot be filtered out by the at least one fixed filter part or for which no suitable filter part is yet available in the database.

Then, the method proceeds to step S115 and the controller 8 generates a signal for a counter-sound based on the fully configured noise filter and sends this signal to the loudspeaker 4 for emitting the counter-sound and cancelling the disturbing noise.

The method ends then with the following step S116.

The invention claimed is:

1. A noise cancellation system for a vehicle, the system comprising:

a microphone for receiving noise and generating a corresponding noise signal;

a loudspeaker for emitting an acoustic wave according to a cancellation signal to cancel the noise;

a position determination unit for determining a vehicle position, the vehicle-related information including the vehicle position; and a control unit comprising a memory and a controller, the memory including a noise filter, the controller being configured to:

obtain vehicle-related information of the vehicle, configure the noise filter based on the at vehicle-related information, and generate the cancellation signal based on the noise signal and the noise filter;

wherein the controller is configured to determine whether the vehicle is located within an agricultural field based on the vehicle position, and wherein the noise filter is activated if the vehicle is located within the agricultural field.

2. The noise cancellation system of claim 1, wherein the memory includes a modular noise filter including at least two filter parts, a different filter part being adapted to cancel a different noise, and the controller is configured to select at least one of the at least two filter parts to configure the noise filter.

3. The noise cancellation system of claim 1, further comprising a sensor for detecting a vehicle parameter, the vehicle-related information including the vehicle parameter.

4. The noise cancellation system of claim 1, wherein the vehicle-related information includes weather information based on the vehicle position.

5. The noise cancellation system of claim 1, wherein the controller is configured to obtain second vehicle-related information of a second vehicle, wherein the vehicle-related information includes at least the second vehicle-related information of the second vehicle.

6. The noise cancellation system of claim 1, wherein the controller is configured to analyze a sequence comprising at least a command to be executed automatically by the vehicle at the vehicle position; and to obtain the at least one vehicle related information of the vehicle based on the sequence.

7. The noise cancellation system of claim 1, wherein the controller is configured to reconfigure the noise filter based on the vehicle-related information if the vehicle-related information of the vehicle has been changed.

8. The noise cancellation system of claim 1, wherein the controller is configured to detect noise exceeding a threshold while a noise filter based noise cancellation is active, and to perform a method for active noise cancellation to cancel the noise exceeding the threshold.

9. The noise cancellation system of claim 1, wherein the controller is configured to analyze the noise, to detect a noise resulting from a damage or a fault of the vehicle, and to exclude the noise resulting from the damage or the fault from noise cancellation.

10. A noise cancellation system for a vehicle, the system comprising:

a microphone for receiving noise and generating a corresponding noise signal;

a loudspeaker for emitting an acoustic wave according to a cancellation signal to cancel the noise;

and a control unit comprising a memory and a controller, the memory including a noise filter, the controller being configured to:

obtain vehicle-related information of the vehicle, wherein the vehicle-related information comprises a type of an implement connected with the vehicle;

configure the noise filter based on the at vehicle-related information, and generate the cancellation signal based on the noise signal and the noise filter.

11. A noise cancellation system for a vehicle, the system comprising:

a microphone for receiving noise and generating a corresponding noise signal;

a loudspeaker for emitting an acoustic wave according to a cancellation signal to cancel the noise;

a position determination unit for determining a vehicle position, the vehicle-related information including the vehicle position, wherein the vehicle-related information includes at least a field property of an agricultural field based on the vehicle position; and a control unit comprising a memory and a controller, the memory including a noise filter, the controller being configured to:

obtain vehicle-related information of the vehicle, configure the noise filter based on the at vehicle-related information, and generate the cancellation signal based on the noise signal and the noise filter.

12. The noise cancellation system of claim 11, wherein the field property of the agricultural field includes at least a characteristic of plants planted in the agricultural field.

13. A noise cancellation system for a vehicle, the system comprising:

a microphone for receiving noise and generating a corresponding noise signal;

a loudspeaker for emitting an acoustic wave according to a cancellation signal to cancel the noise;

a position determination unit for determining a vehicle position, the vehicle-related information including the vehicle position; and a control unit comprising a memory and a controller, the memory including a noise filter, the controller being configured to:

obtain vehicle-related information of the vehicle;

configure the noise filter based on the at vehicle-related information; and generate the cancellation signal based on the noise signal and the noise filter;

wherein the controller is configured to determine whether the vehicle is located outside of an agricultural field based on the vehicle position, and wherein the noise filter is deactivated if the vehicle is located outside of the agricultural field.

14. A noise cancellation system for a vehicle, the system comprising:

a microphone for receiving noise and generating a corresponding noise signal;

a loudspeaker for emitting an acoustic wave according to a cancellation signal to cancel the noise;

and a control unit comprising a memory and a controller, the memory including a noise filter, the controller being configured to:

obtain vehicle-related information of the vehicle;

obtain second vehicle-related information of a second vehicle, wherein the vehicle-related information includes at least the second vehicle-related information of the second vehicle;

configure the noise filter based on the at vehicle-related information; and generate the cancellation signal based on the noise signal and the noise filter;

wherein the second vehicle-related information of the second vehicle includes a position of the second vehicle; and wherein the controller is configured to calculate a distance between the both vehicles and to configure the noise filter based on the distance.

15. A noise cancellation system for a vehicle, the system comprising:

a microphone for receiving noise and generating a corresponding noise signal;

a loudspeaker for emitting an acoustic wave according to a cancellation signal to cancel the noise;

and a control unit comprising a memory and a controller, the memory including a noise filter, the controller being configured to:

obtain vehicle-related information of the vehicle;

configure the noise filter based on the at vehicle-related information; and generate the cancellation signal based on the noise signal and the noise filter;

wherein the controller is further configured to detect noise exceeding a threshold while a noise filter based noise cancellation is active, to perform a method for active noise cancellation to cancel the noise exceeding the threshold, to generate a new filter part to cancel the noise exceeding the threshold, and to store the new filter part to the memory.

16. A method for performing noise cancellation for a vehicle, comprising:

receiving a noise;

generating a noise signal corresponding to the received noise;

obtaining at least one vehicle related information of comprising a position of the vehicle;

determining whether the vehicle is located within an agricultural field based on the first vehicle related information;

configuring a noise filter based on the at least one vehicle related information if the vehicle is located within the agricultural field;

generating a cancellation signal based on the noise signal and the noise filter; and emitting an acoustic wave according to the cancellation signal to cancel the noise.

* * * * *